(12) United States Patent
Sakaguchi

(10) Patent No.: US 9,525,813 B2
(45) Date of Patent: Dec. 20, 2016

(54) IMAGING APPARATUS AND METHOD FOR CONTROLLING SAME

(71) Applicant: CANON KABUSHIKI KAISHA, Tokyo (JP)

(72) Inventor: Takeshi Sakaguchi, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 289 days.

(21) Appl. No.: 14/265,881

(22) Filed: Apr. 30, 2014

(65) Prior Publication Data

US 2014/0333823 A1    Nov. 13, 2014

(30) Foreign Application Priority Data

May 9, 2013   (JP) ................................. 2013-099184

(51) Int. Cl.
  *H04N 5/225* (2006.01)
  *H04N 5/232* (2006.01)
  *H04N 5/235* (2006.01)
  *H04N 5/369* (2011.01)
  *H04N 9/04* (2006.01)
  *H04N 9/07* (2006.01)

(52) U.S. Cl.
  CPC ........ *H04N 5/23212* (2013.01); *H04N 5/2353* (2013.01); *H04N 5/23209* (2013.01); *H04N 5/3696* (2013.01); *H04N 9/045* (2013.01); *H04N 9/07* (2013.01)

(58) Field of Classification Search
  CPC .................................................. H04N 5/3696
  USPC ....................................... 348/222.1, 340, 345
  See application file for complete search history.

(56) References Cited

U.S. PATENT DOCUMENTS

| | | | | |
|---|---|---|---|---|
| 2010/0188532 | A1* | 7/2010 | Kusaka | H04N 9/045 348/240.99 |
| 2014/0146196 | A1* | 5/2014 | Shoda | H04N 5/23212 348/222.1 |
| 2015/0256738 | A1* | 9/2015 | Inoue | G02B 7/34 348/362 |
| 2016/0014359 | A1* | 1/2016 | Ota | H04N 5/3696 348/223.1 |

FOREIGN PATENT DOCUMENTS

| | | |
|---|---|---|
| JP | 01-157173 A | 6/1989 |
| JP | 2006-215391 A | 8/2006 |

* cited by examiner

*Primary Examiner* — Jason Flohre
*Assistant Examiner* — Dwight C Tejano
(74) *Attorney, Agent, or Firm* — Cowan, Liebowitz & Latman, P.C.

(57) ABSTRACT

A control device acquires a focus detection signal from a pixel portion of the imaging element so as to detect a focus state by phase difference detection. A camera control unit performs focus adjustment control by the drive control of a focus lens constituting an imaging optical system. The camera control unit performs exposure control for adjusting the brightness of an object in the focus area to an appropriate level, and determines whether or not the brightness level of the object in the focus area is saturated based on the focus detection signal. When the exposure state during a focus adjustment operation is not in an appropriate state, the camera control unit calculates an exposure correction value and determines whether or not the exposure correction value falls within the exposure control range. When the exposure correction value falls within the exposure control range, the exposure state is readjusted.

22 Claims, 7 Drawing Sheets

IMAGING APPARATUS AND METHOD FOR CONTROLLING SAME

BACKGROUND OF THE INVENTION

Field of the Invention

The present invention relates to an auto-focus adjustment device of an imaging apparatus. In particular, the present invention relates to an auto-focus adjustment technique suitable for use in cameras or the like having a focus adjustment function using an imaging plane phase difference detection method.

Description of the Related Art

There have been proposed auto-focus adjustment (AF) devices that perform pupil division-type phase difference detection using a pair of photoelectric conversion units provided in each microlens in two-dimensional array. The AF device of this type detects a positional phase difference between two light fluxes (between object images) transmitted through different portions of the pupil of an imaging optical system and converts the positional phase difference into the amount of defocus. In general, a focus lens is driven each time the amount of defocus is detected until the focus is adjusted on an object. This is because a conversion coefficient used when the amount of defocus detected is converted into a pulse as the drive amount for a lens differs for each focus position. In other words, the AF device acquires a conversion coefficient at current focus position and then updates the number of drive pulses so as to obtain an in-focus state. As compared with the in-focus state, two object images blur in an out-of-focus state. Thus, the amount of defocus cannot be detected or when the amount of defocus includes an error, an in-focus state cannot be obtained by moving a lens after one-time detection of the amount of defocus. Defocus amount detection and focus adjustment needs to be performed by periodically acquiring two object images.

In the camera including a phase difference detection-type AF device, exposure control is typically performed so as to obtain a brightness signal suitable for use in focus adjustment but is performed with the focus lens stopped. In other words, in the phase difference detection method for repeatedly driving a focus lens until the focus lens is finally located in the in-focus position after periodical detection of the amount of defocus, exposure control is performed prior to start of driving of the lens. In the method, the following phenomenon occurs in a state where an object image is largely blurred. In particular, in the case of a high brightness object, the brightness level of the object becomes relatively high when the focus is on the object to some extent. However, when the focus is being adjusted on the object while performing exposure control in a state where the object image is largely blurred, the level of the brightness signal obtained from the imaging element becomes too high and reaches a saturated state. When the contrast of an object to which the focus wants to be adjusted cannot be appropriately evaluated due to saturation, erroneous detection of the focus state occurs, so that the focus lens cannot be in an in-focus state or in a largely-defocused state.

In order to counteract this phenomenon, Japanese Patent Laid-Open No. H1-157173 discloses a method for not using a focus area determined to be a high brightness object and its peripheral focus areas from among a plurality of focus areas. Japanese Patent Laid-Open No. 2006-215391 discloses a method for not performing focus adjustment when the proportion of the area within a focus area in a range where the brightness level is saturated to the area of the focus area is equal to or greater than a predetermined level.

However, in the conventional technique disclosed in Japanese Patent Laid-Open No. H1-157173, when the high brightness object exists on the selected focus area, an area other than the focus area is selected. In the conventional technique disclosed in Japanese Patent Laid-Open No. 2006-215391, when the selected focus area corresponds to the high brightness object, the focus cannot be reached at the focus area. When the brightness of the object is high, a result different from capturing a focused image in a composition as intended by a photographer may be obtained.

In some image-taking lenses (so-called macrolens) for close-up photography, an effective open F-number may rapidly change when the lens is extended. For example, when the focus is adjusted on the object corresponding to a macro area from the outside of the macro area, it is assumed that the brightness of the object within the focus area is appropriately obtained by exposure control prior to start of driving of the focus lens. However, the level of the brightness signal obtained from the imaging element becomes low when the lens is extended, resulting in deviation from appropriate exposure. When the contrast of the object to which the focus wants to be adjusted cannot be appropriately evaluated under such a condition, erroneous detection of the focus state occurs, so that the focus lens cannot be in an in-focus state or in a largely-defocused state.

SUMMARY OF THE INVENTION

The present invention provides an imaging apparatus that is adapted to obtain a focus detection signal suitable for use in focus adjustment control by readjusting an exposure state during a focus adjustment operation.

According to an aspect of the present invention, a control device is provided that includes a detecting unit configured to acquire an output signal from an imaging unit having an imaging element so as to perform phase difference type focus detection, wherein the imaging element outputs a signal photoelectrically converted at a predetermined cycle; and a control unit configured to perform exposure control of the imaging element and to perform focus adjustment control of an imaging optical system with respect to an object by acquiring detection information from the detecting unit. When the control unit determines that an output signal for phase difference type focus detection from the imaging unit is saturated while performing the focus adjustment control, the control unit performs exposure control so as not to saturate the output signal from the imaging unit.

According to the present invention, a focus detection signal suitable for use in focus adjustment control may be obtained by readjusting an exposure state during a focus adjustment operation.

Further features of the present invention will become apparent from the following description of exemplary embodiments with reference to the attached drawings.

DESCRIPTION OF THE EMBODIMENTS

Figure 1:
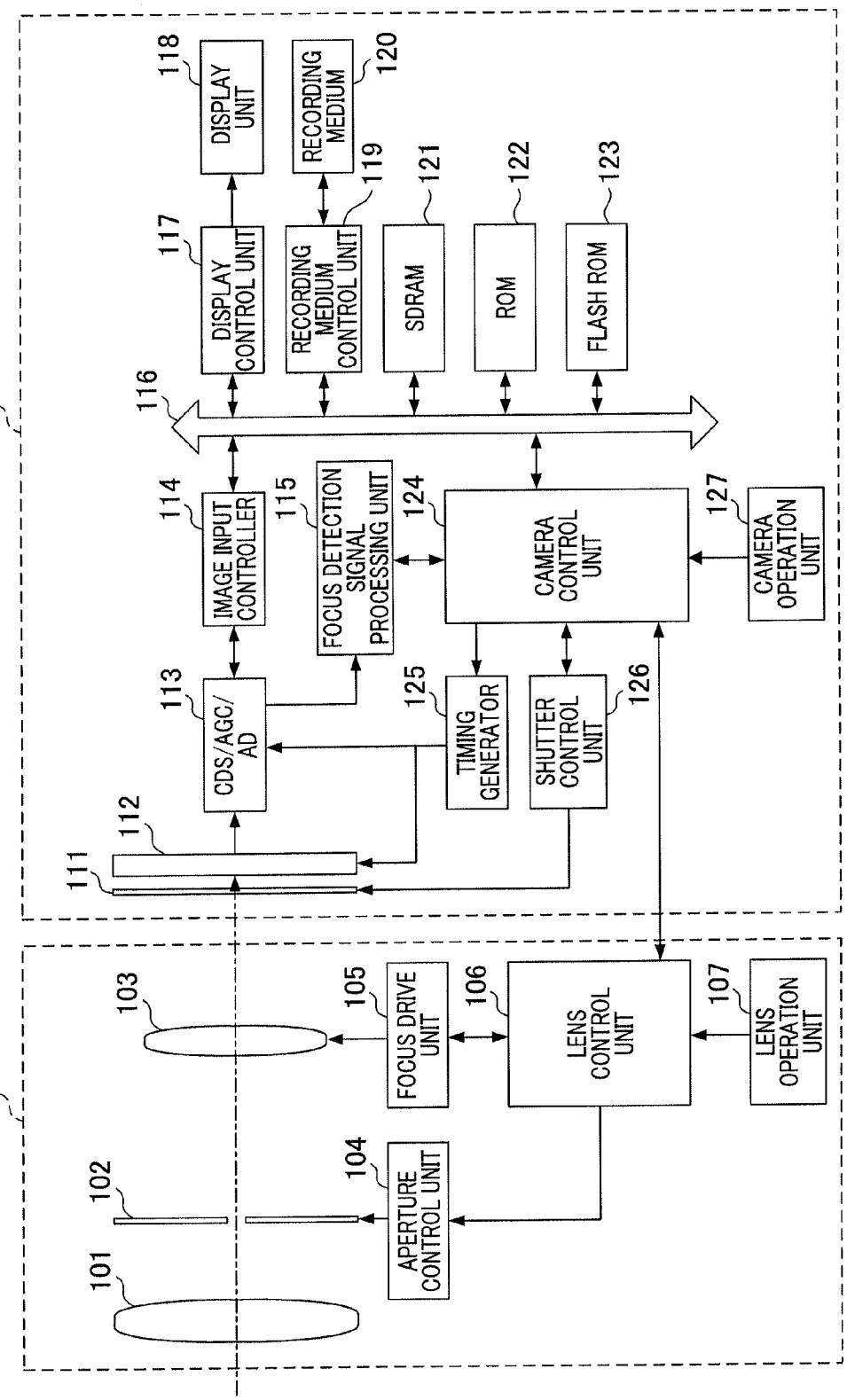
FIG. 1 is a block diagram illustrating an exemplary configuration of an imaging apparatus according to an embodiment of the present invention.

Hereinafter, preferred embodiments of the present invention will be described with reference to the drawings. In the following embodiments, a description will be given by taking an example of a lens-interchangeable camera in which an image-taking lens is mounted on a camera main body.

(First Embodiment)

Hereinafter, a description will be given of a configuration of an imaging apparatus according to a first embodiment of the present invention with reference to FIG. 1. The imaging apparatus is comprised of an image-taking lens 10 and a camera main body 11. A lens control unit 106 integrally controls the operation of the entire image-taking lens and a camera control unit 124 integrally controls the operation of the entire camera.

Firstly, a description will be given of a configuration of the image-taking lens 10. A fixed lens 101, an aperture 102, and a focus lens 103 constitute an imaging optical system. The fixed lens 101 is a first group lens and the focus lens 103 is a movable optical element for focus adjustment. The focus lens 103 is driven by a focus drive unit 105. The aperture 102 is driven by an aperture control unit 104, and controls the amount of light incident on an imaging element 112 to be described below. The lens control unit 106 controls the aperture control unit 104 and the focus drive unit 105 so as to cause them to determine the amount of opening of the aperture 102 and the position of the focus lens 103, respectively.

Upon accepting a user operation instruction given by a lens operation unit 107, the lens control unit 106 performs control in response to the user operation instruction. The lens control unit 106 also controls the aperture control unit 104 and the focus drive unit 105 in accordance with a control command from the camera control unit 124.

Next, a description will be given of a configuration of the camera main body 11. The camera main body 11 acquires an imaging signal from a light flux passed through the imaging optical system of the image-taking lens 10. A shutter 111 controls the amount of light incident on the imaging element 112. The imaging element 112 is a charge coupled device (CCD) sensor or a complementary metal-oxide semiconductor (CMOS) sensor. The light flux passed through the imaging optical system is imaged on a light receiving plane of the imaging element 112, and is converted into signal charges depending on the amount of incident light by photodiodes (hereinafter abbreviated as "PD") constituting a photoelectric conversion unit. Signal charges accumulated in the respective PDs are sequentially read from the imaging element 112 as voltage signals corresponding to the signal charges based on drive pulses given from a timing generator 125 in accordance with an instruction given by the camera control unit 124.

Figure 2B:
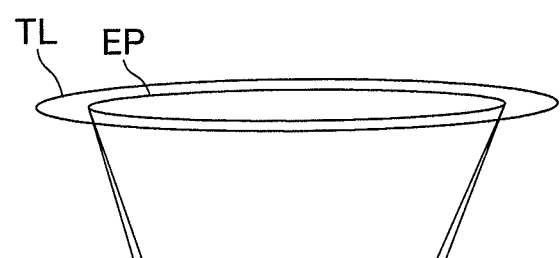
FIGS. 2A and 2B are schematic diagrams illustrating a configuration of a pixel portion of the imaging element shown in FIG. 1.
Figure 2A:
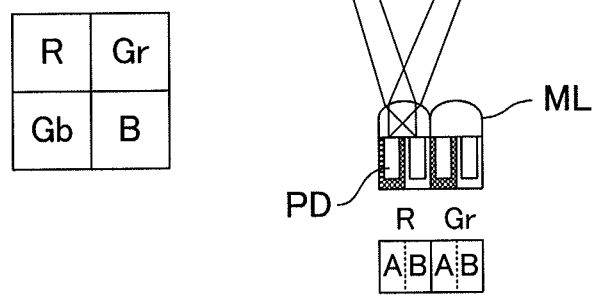

FIGS. 2A and 2B are schematic diagrams illustrating an exemplary configuration of a pixel portion of the imaging element 112. FIG. 2A shows a filter array of pixels corresponding to R (red), B (blur), and Gr and Gb (green) colors. FIG. 2B shows an optical relationship among an imaging optical system TL, a microlens ML, and PDs.

The imaging element 112 has a plurality of (two in FIG. 2B) PDs in one pixel portion in order to perform focus detection using an imaging plane phase difference detection method. The light fluxes passed through the entire region of an exit pupil (EP) of the imaging optical system TL are separated by the microlens ML, and are imaged on two PDs so as to extract an imaging signal and a focus detection signal. A signal "A+B" obtained by summing signals output from two PDs is an imaging signal. Output signals A and B respectively output from two PDs are two image signals for focus detection. Such pixel portions are arranged dispersedly across the entire region of the imaging element 112, so that focus detection can be performed on the entire region of an imaging screen. A focus detection signal processing unit 115 to be described below performs focus detection based on a focus detection signal and performs correlation computation for a pair of image signals so as to calculate an image deviation amount and various types of reliability information.

The imaging signal and the focus detection signal read from the imaging element 112 are input to a CDS/AGC/AD converter 113 shown in FIG. 1. A CDS circuit performs correlating double sampling for removing a reset noise, and an AGC circuit performs automatic gain control. An AD converter converts an analog input signal into a digital signal. The CDS/AGC/AD converter 113 outputs an imaging signal to an image input controller 114 and outputs a phase difference focus detection signal to the focus detection signal processing unit 115.

The image input controller 114 stores an imaging signal output from the CDS/AGC/AD converter 113 in a Synchronous Dynamic Random Access Memory (SDRAM) 121. The image signal stored in the SDRAM 121 is transmitted to a display control unit 117 via a bus 116 and is image-displayed on a display unit 118. In an imaging signal recording mode, a recording medium control unit 119 records image data in a recording medium 120. A read only memory (ROM) 122 connected via the bus 116 stores a control program executed by the camera control unit 124 and various data or the like required for control. A flash ROM 123 stores various types of setting information or the like relating to the operation of the camera main body 11, such as user setting information or the like.

The focus detection signal processing unit 115 performs correlation computation by acquiring two image signals for focus detection from the CDS/AGC/AD converter 113 so as to calculate an image deviation amount. Detection information including the calculated image deviation amount is output to the camera control unit 124. The focus detection signal processing unit 115 also performs saturation determination for two image signals for focus detection and then outputs information about the result of saturation determination to the camera control unit 124. While, in the present embodiment, an imaging signal and two focus detection signals, i.e., three signals are extracted from the imaging element 112, the present invention is not limited to such a method. Taking into consideration of the load on the imaging element 112, one imaging signal and one focus detection signal may also be extracted so as to perform processing for generating another focus detection signal by determining a difference between the imaging signal and the focus detection signal.

The camera control unit 124 performs various types of control by transmitting/receiving information to/from the respective units. The camera control unit 124 executes processing performed in the camera main body 11 and various types of processing such as ON/OFF control of a power supply, a change in settings, a start of recording, a start of a focus detection operation, a check of recorded video, and the like in accordance with an operation input signal from a camera operation unit 127. Also, the camera control unit 124 communicates with the lens control unit 106 provided in the image-taking lens 10, transmits a control command or control information for a movable optical element or the like to the lens control unit 106, and acquires optical information or the like for the image-taking lens 10. A shutter control unit 126 controls the operation of the shutter 111 in accordance with a control command from the camera control unit 124.

Figure 3:
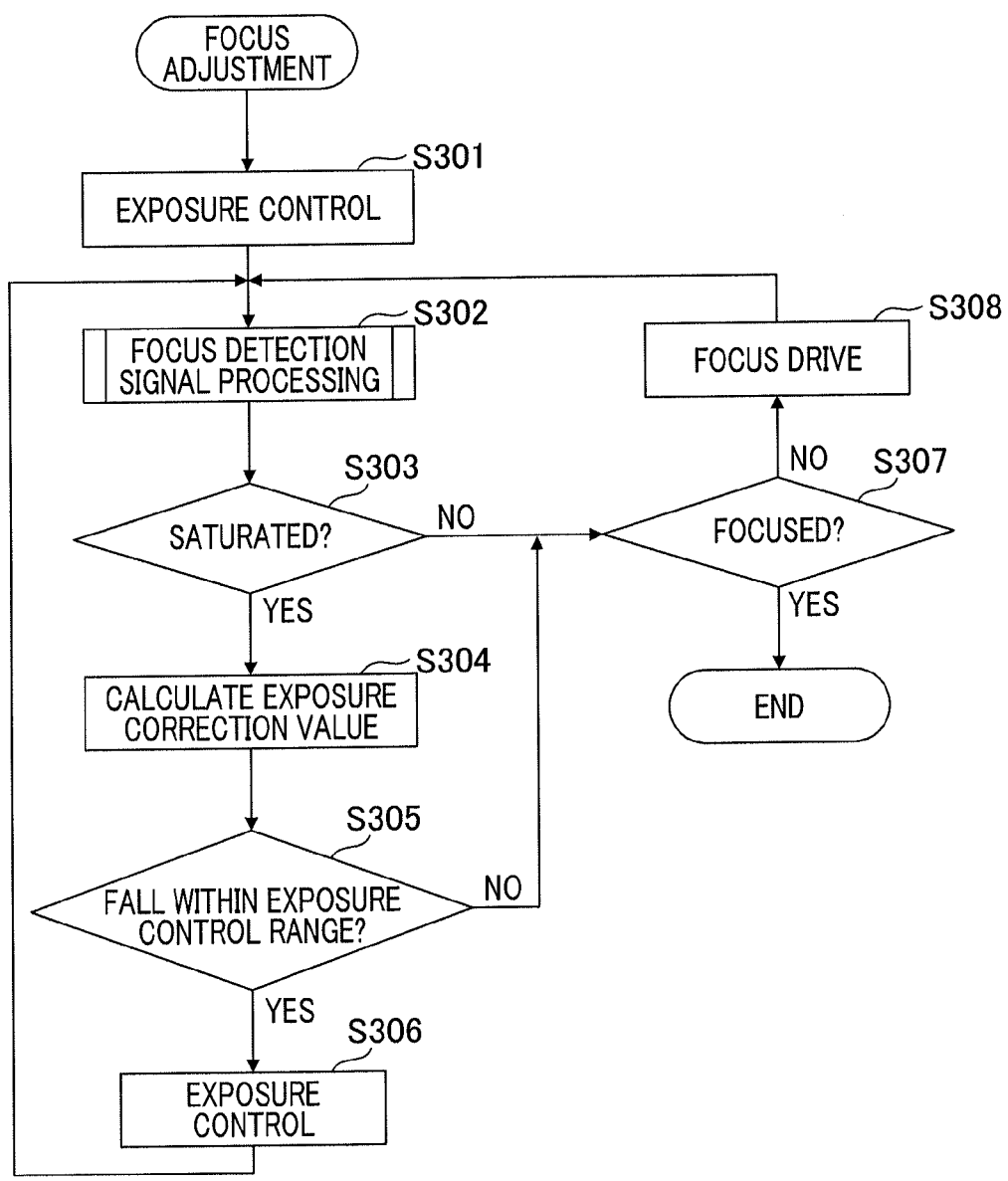
FIG. 3 is a flowchart illustrating focus adjustment according to a first embodiment of the present invention.

Next, a description will be given of the flow of focus adjustment according to the present embodiment with reference to the flowchart shown in FIG. 3. The following processing is implemented by execution of a program by the central processing unit (CPU) of the camera control unit 124.

In step S301, the camera control unit 124 performs exposure control such that the brightness of an object in the selected focus area (in the target area in which focus adjustment is performed on the imaging screen) is adjusted to an appropriate exposure state. In step S302, the focus detection signal processing unit 115 acquires two image signals for focus detection output from the CDS/AGC/AD converter 113 so as to perform saturation determination for the image signals and correlation computation therebetween. The details of focus detection signal processing will be described below. In step S303, the camera control unit 124 performs saturation determination for the brightness level of the focus area. When the camera control unit 124 determines that the brightness level of the object corresponding to the target area is saturated, the process advances to step S304, whereas when the camera control unit 124 determines that the brightness level of the object corresponding to the target area is not saturated, the process advances to step S307.

In step S304, the camera control unit 124 calculates a correction value for a current exposure state. When the brightness level of the focus area is saturated, the brightness level is over than that in an appropriate exposure state, and thus, an exposure correction value is a value on the under side. While, in the present embodiment, a description will be given by taking an example in which a correction value is a fixed value set to one-stage under side, the present invention is not limited to such a correction method. For example, a correction value may also be calculated based on an image signal of which the brightness level is saturated. The same exposure correction is also applied to embodiments to be described below. In step S305, the camera control unit 124 determines whether or not the exposure correction value calculated in step S304 falls within the exposure control range. When the correction value falls within the exposure control range, the process advances to step S306, whereas when the correction value falls outside the exposure control range, the process advances to step S307.

In step S306, exposure control is performed again such that the brightness of the object corresponding to the selected focus area is in an appropriate exposure state, and then the process returns to step S302 after readjustment. More specifically, exposure control is at least one of charge accumulation time control of the imaging element, gain control of the output signal, and aperture control of the imaging optical system, and the charge accumulation time control of the imaging element and the gain control of the output signal are executed in priority over the aperture control of the imaging optical system depending on the brightness level. In step S307, the camera control unit 124 performs focus determination. The camera control unit 124 determines whether or not the amount of defocus determined from the image deviation amount calculated by correlation computation in step S302 falls within the focus range. When the amount of defocus falls within the focus range, focus adjustment ends, whereas when the amount of defocus falls outside the focus range, the process advances to step S308. In step S308, the camera control unit 124 transmits a focus drive command to the lens control unit 106 based on the amount of defocus determined from the image deviation amount calculated by correlation computation in step S302. The lens control unit 106 moves the focus lens 103 via the focus drive unit 105 in accordance with the focus drive command so as to perform focus adjustment. Then, the process returns to step S302.

In the focus adjustment of the present embodiment, two image signals for focus detection are acquired in step S302 after exposure control in step S301, and the processes in steps S303, S307, and S308 are executed until the amount of defocus calculated from the image deviation amount falls within a predetermined range (focus range). When two image signals for focus detection are not saturated during this period, the state of focus is determined to be either an in-focus state or an out-of-focus state and then focus adjustment ends. On the other hand, when shooting a high brightness object, image signals for focus detection may be saturated. In this case, the processes in steps S302 to S306 are repeated until image signals suitable for use in focus adjustment are obtained or image signals fall within a range which can be adjusted by exposure control. Thus, when the focus adjustment is performed by moving the focus lens 103, an exposure state can be readjusted to an appropriate level even when image signals are saturated. Consequently, focus detection signals suitable for use in focus adjustment are obtained, so that the amount of defocus to a position to which the focus wants to be adjusted can be readily detected. Then, the processes in steps S302, S303, S307, and S308 are repeated until the amount of defocus falls within the focus range.

Figure 4:
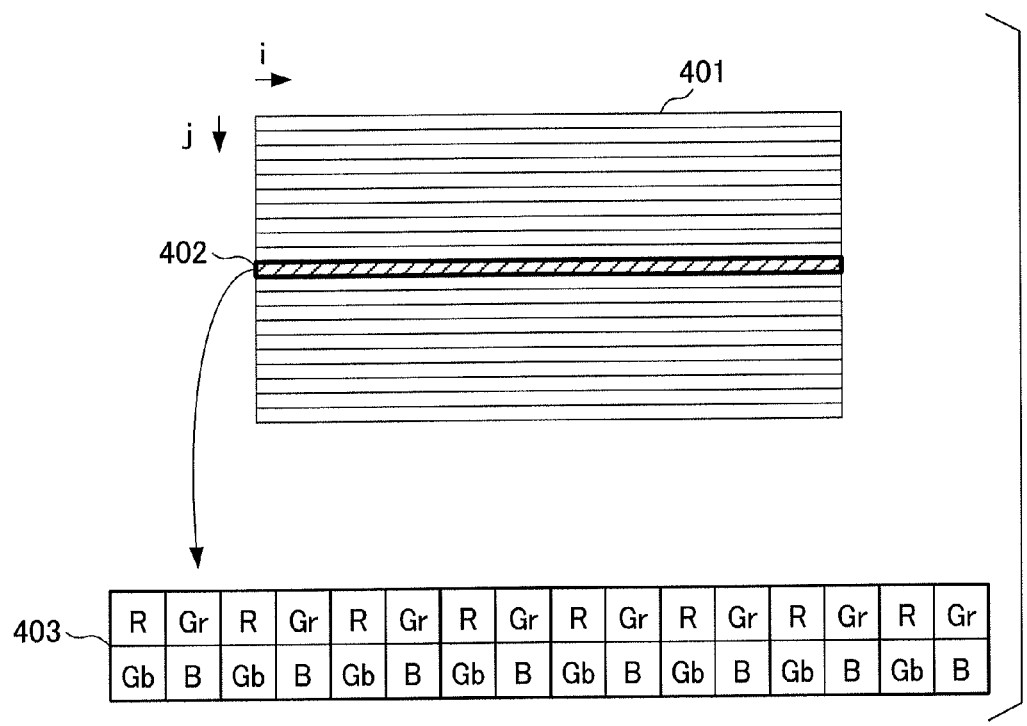
FIG. 4 is a schematic diagram illustrating a configuration of pixels in a focus area.

Next, a schematic description will be given of saturation determination processing according to the present embodiment with reference to FIG. 4. In FIG. 4, the symbol "i" denotes an index for specifying a pixel position and the symbol "j" is an index for specifying a row. A focus area 401 consists of a plurality of rows. Image signals for focus detection are generated by reading pixel data from pixel portions of all the rows in the focus area 401, so that saturation determination processing is executed. FIG. 4 shows the filter array of a portion 403 in which a row 402 is enlarged in the unit of pixels. Saturation determination processing includes first to third determination processing.

First determination processing: pixel-by-pixel basis determination processing for determining the saturation level of the focus detection signal on the pixel-by-pixel basis by reading out signals on the pixel-by-pixel basis.

Second determination processing: row-by-row basis determination processing for determining the saturation level of the focus detection signal on the row-by-row basis by reading out signals from all the pixels in one row.

Third determination processing: area determination processing for the focus area 401.

The focus detection signal processing unit 115 performs first and second determination processing, and the camera control unit 124 performs third determination processing. The processing load is reduced as compared with that exerted when the camera control unit 124 performs first to third determination processing.

Figure 5:
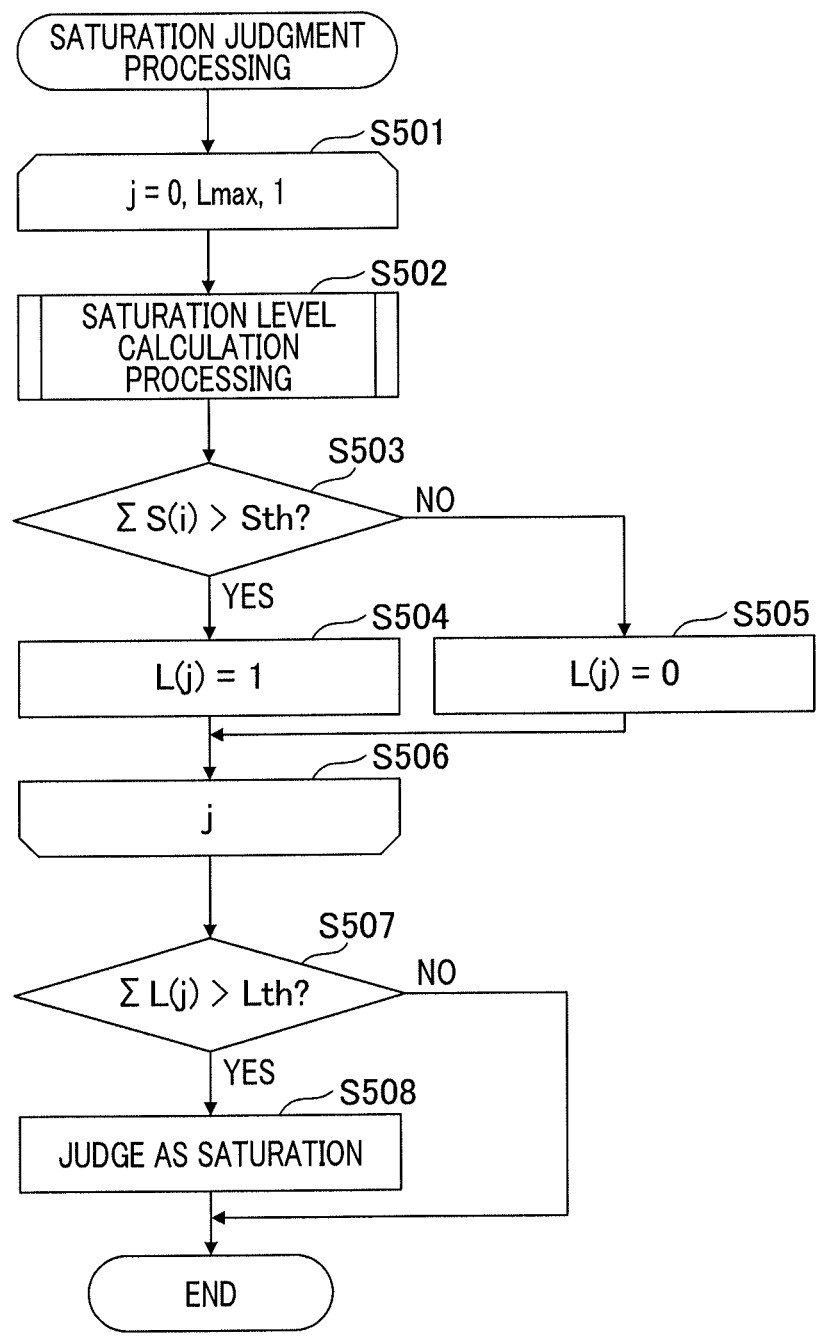
FIG. 5 is a flowchart illustrating saturation determination processing according to an embodiment of the present invention.

A detailed description will be given of saturation determination processing with reference to the flowchart shown in FIG. 5. The same notation as that shown in FIG. 4 is also used in FIG. 5. Iteration processing is executed in steps S501 to S506. In step S501, the initial value of j is zero and increments one by one from zero to the maximum value Lmax. In step S502, the saturation level S(i) is calculated by reading out data from each row in the focus area 401. In other words, the saturation level ΣS(i) (Σ represents the summation of indices i) is calculated on the row-by-row basis. In step S503, the saturation level ΣS(i) is compared with the first threshold value Sth. When ΣS(i) is greater than the first threshold value Sth, the process advances to step S504, whereas when ΣS(i) is equal to or less than the first threshold value, the process advances to step S505. In step S504, the row in question is determined to be a saturation row, and the saturation determination value L(j) on the row-by-row basis is set to 1. On the other hand, in step S503, the row in question is determined not to be a saturation row, and the saturation determination value L(j) is set to 0. Saturation level calculation processing in step S502 will be described below.

When data is read from all of the rows (j=Lmax), the saturation level ΣL(j) in the focus area 40 is calculated in step S506 (S represents the summation of indices j). In step S507, ΣL(j) is compared with the second threshold value Lth. When ΣL(j) is greater than the second threshold value Lth, the process shifts to step S508, and it is determined that the brightness level of the focus area 401 is saturated. Then, the saturation determination processing ends. On the other hand, when ΣL(j) is equal to or less than the second threshold value in step S507, it is determined that the brightness level of the focus area 401 is not saturated, and the saturation determination processing ends.

Figure 6:
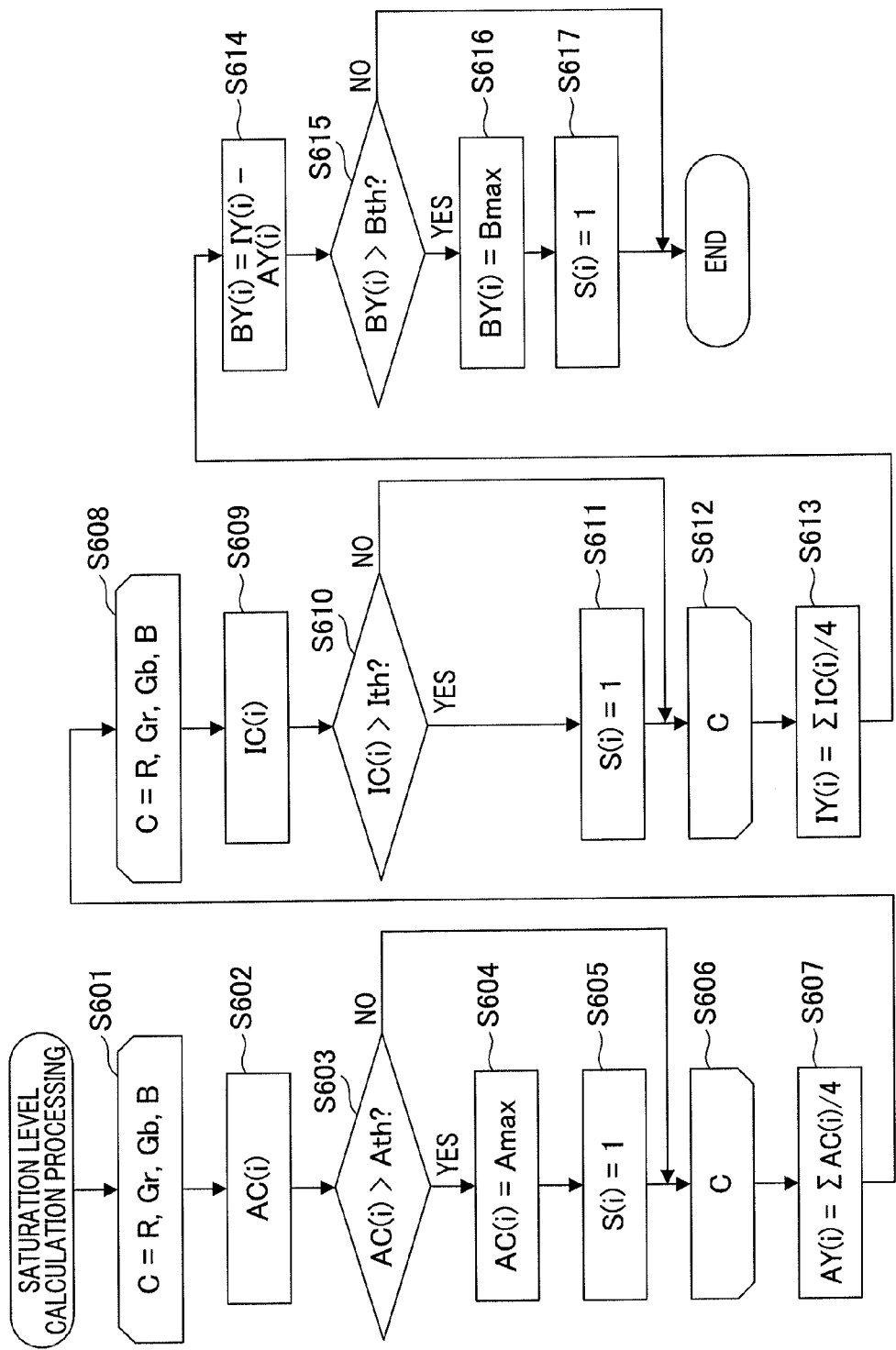
FIG. 6 is a flowchart illustrating saturation level calculation processing according to an embodiment of the present invention.

Next, a detailed description will be given of saturation level calculation processing in step S502 shown in FIG. 5 with reference to the flowchart shown in FIG. 6. Note that the same notation as that shown in FIGS. 4 and 5 is also used in FIG. 6. Firstly, a description will be given of notation used in FIG. 6. An imaging signal (e.g., summation signal "A+B") is denoted as "I" and two image signals for focus detection are represented as an image-A signal and an image-B signal. One pixel of the imaging signal I is identified by a color index C consisting of R, Gr, Gb, and B, and the imaging signal I is constituted by four pixel signals IR, IGr, IGb, and IB. Hereinafter, four pixel signals are integrally denoted by IC(i). The brightness signal IY(i) related to the imaging signal I is calculated by average processing for averaging the pixel signal IC(i). Note that the same notation is also used for the image-A signal and the image-B signal, and the pixel signal for the image A is denoted by AC(i), the brightness signal for the image A is denoted by AY(i), the pixel signal for the image B is denoted by BC(i), and the brightness signal for the image B is denoted by BY(i).

Hereinafter, a description will be given of the flow of saturation level calculation processing. In the iteration processing performed between steps S601 and S606, saturation determination for the image-A signal is performed. In step S601, the color index C is changed in sequence of, for example, R, Gr, Gb, and B. In step S602, the pixel signal AC(i) for the image A is read. In step S603, the pixel signal AC(i) is compared with the saturation determination threshold value Ath for the image-A signal. When the pixel signal AC(i) is greater than the saturation determination threshold value Ath for the image-A signal, the process shifts to step S604. When the pixel signal AC(i) is equal to or less than the saturation determination threshold value Ath for the image-A signal, the process shifts to step S606. In step S604, the pixel signal AC(i) is set to an image-A signal clip value Amax which is an upper limit value. In step S605, the saturation determination value S(i) on the pixel-by-pixel basis is set to 1. When the pixel signals AC(i) are completely read for all the color indices C in steps S601 to S606, the process shifts to step S607, and the brightness signal AY(i) for the image A is calculated by dividing ΣAC(i) by four.

Next, in the iteration processing performed between step S608 and step S612, saturation determination for the imaging signal is performed. In step S608, the color index C is changed in sequence of, for example, R, Gr, Gb, and B. In step S609, the pixel signal IC(i) is read. In step S610, the pixel signal IC(i) is compared with the saturation determination threshold value Ith for the imaging signal. When the pixel signal IC(i) is greater than the saturation determination threshold value Ith for the imaging signal, the process shifts to step S611. When the pixel signal IC(i) is equal to or less than the saturation determination threshold value Ith for the imaging signal, the process shifts to step S612. In step S611, the saturation determination value S(i) on the pixel-by-pixel basis is set to 1. When the pixel signals IC(i) are completely read for all the color indices C in steps S608 to S612, the brightness signal IY(i) is calculated by dividing ΣIC(i) by four in step S613.

Furthermore, the process advances to step S614, and the brightness signal BY(i) for the image B is calculated by subtracting AY(i) from IY(i). In other words, the brightness signal AY(i) for the image A is subtracted from the brightness signal IY(i) related to the imaging signal. In step S615, the brightness signal BY(i) for the image B is compared with the saturation determination threshold value Bth for the image-B signal. When BY(i) is greater than the saturation determination threshold value Bth for the image-B signal, the process shifts to step S616, whereas when BY(i) is equal to or less than the saturation determination threshold value Bth for the image-B signal, the saturation level calculation processing ends. In step S616, the brightness signal BY(i) is set to an image-B signal clip value Bmax which is an upper limit value. In step S617, the saturation determination value S(i) on the pixel-by-pixel basis is set to 1. After the processing is performed for all the indices i, the saturation level calculation processing ends.

In the present embodiment, an exposure state can be readjusted to an appropriate level in the focus area based on the result of saturation determination processing performed during focus adjustment by driving the focus lens. In the case of a high brightness object, the level of the brightness signal obtained from the imaging element may be saturated as the focus lens approaches to the focused state but an exposure state can be adjusted to an appropriate level. Consequently, the brightness signal of the object image, which is suitable for use in focus adjustment control, can be obtained in the focus area, resulting in stabilization of a focus adjustment operation and suppression of occurrence of erroneous detection of the focus state.

(Second Embodiment)

Next, a description will be given of a second embodiment of the present invention. In the second embodiment, the same elements as those in the first embodiment are designated by the same reference numerals and explanation thereof will be omitted. A description will be given mainly of the differences from the first embodiment.

Figure 7:
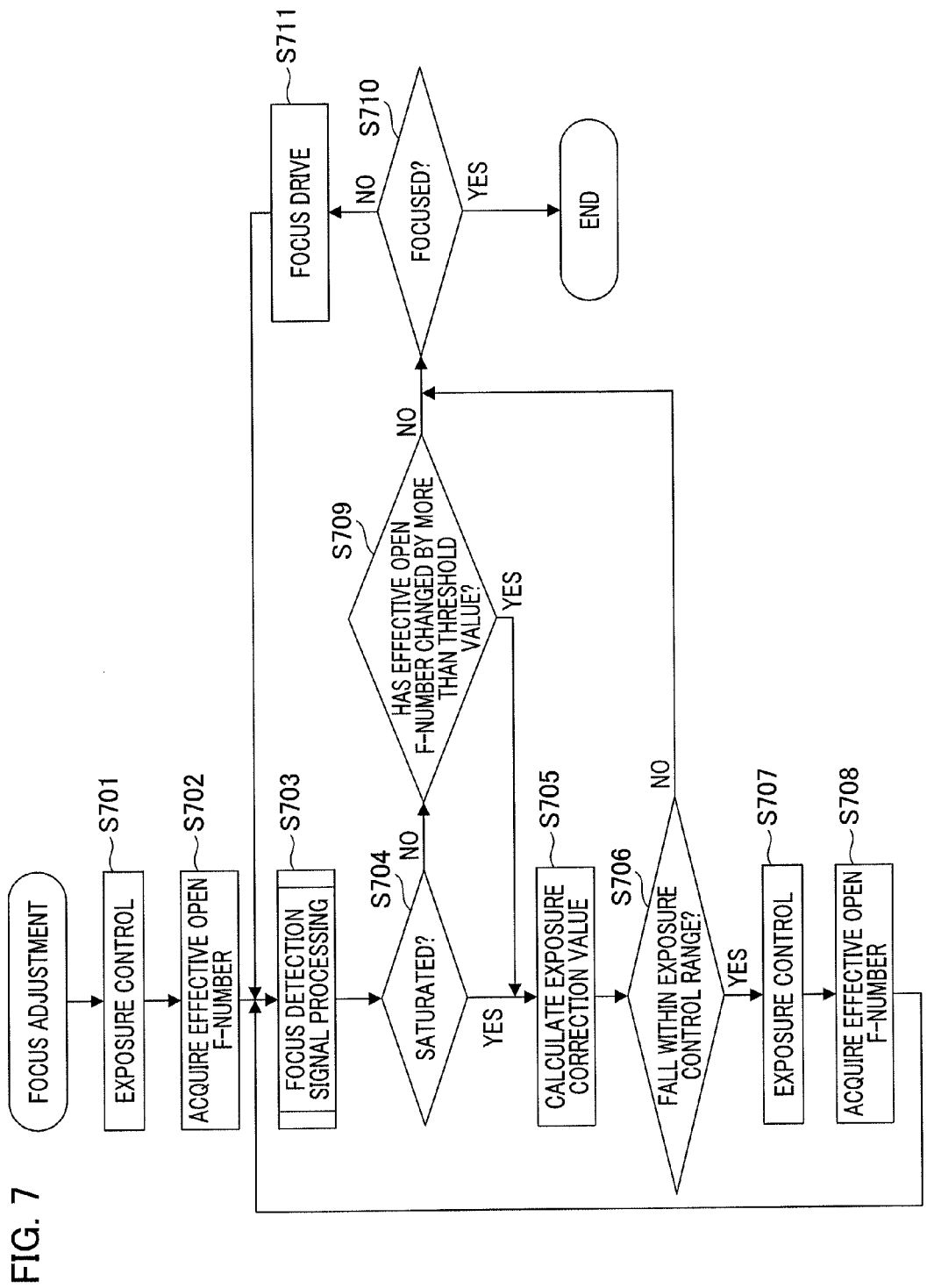
FIG. 7 is a flowchart illustrating focus adjustment according to a second embodiment of the present invention.

A description will be given of focus adjustment according to the present embodiment with reference to the flowchart shown in FIG. 7. In step S701, the camera control unit 124 performs exposure control such that the brightness of the object in the selected focus area is in an appropriate exposure state. In step S702, the camera control unit 124 acquires the effective open F-number of the image-taking lens 10 from the lens control unit 106 and stores the effective open F-number in a memory. In step S703, the focus detection signal processing unit 115 performs saturation determination and correlation computation based on two image signals for focus detection output from the CDS/AGC/AD converter 113 so as to output detection information or the like. The details of focus detection signal processing are as described above. In step S704, the camera control unit 124 performs saturation determination processing relating to the focus area 401. When the camera control unit 124 determines that the brightness level of the focus area 401 is saturated, the process advances to step S705, whereas when the camera control unit 124 determines that the brightness level of the focus area 401 is not saturated, the process advances to step S709.

In step S705, the camera control unit 124 calculates a correction value for a current exposure state. When the brightness level of the focus area 401 is saturated, the brightness level is over than that in an appropriate exposure state, and thus, an exposure correction value is a value on the under side. In step S706, the camera control unit 124 determines whether or not the exposure correction value calculated in step S705 falls within the exposure control range. When the exposure correction value falls within the exposure control range, the process advances to step S707, whereas when the exposure correction value falls outside the exposure control range, the process advances to step S710. In step S707, the camera control unit 124 performs exposure control for readjustment such that the brightness of the object in the selected focus area is in an appropriate exposure state. In step S708, the camera control unit 124 acquires the effective open F-number of the image-taking lens 10 from the lens control unit 106 and stores the effective open F-number in a memory. Then, the process returns to step S703.

In step S709, the camera control unit 124 calculates a difference between the current effective open F-number and the effective open F-number acquired in step S702 or S708. When the difference is equal to or greater than a predetermined threshold value, the process advances to step S705, whereas when the difference is less than the threshold value, the process advances to step S710. When the process advances from step S705 and step S706 to step S707, exposure control is performed again such that the brightness of the object in the selected focus area is in an appropriate exposure state. While, in the present embodiment, a description will be given by taking an example in which an exposure correction value is a fixed value to be set step by step, the present invention is not limited to such a correction method. For example, a correction value corresponding to the number of steps upon changing the effective open F-number may also be used. In step S710, the camera control unit 124 performs focus determination. When the amount of defocus determined from the image deviation amount calculated by correlation computation in step S703 falls within the focus range, focus adjustment ends, whereas when the amount of defocus falls outside the focus range, the process advances to step S711. In step S711, the camera control unit 124 transmits a focus drive command to the lens control unit 106 based on the amount of defocus determined from the image deviation amount calculated by correlation computation in step S703. The lens control unit 106 moves the focus lens 103 in the optical axis direction via the focus drive unit 105 so as to perform a focus adjustment operation. Then, the process returns to step S703.

In the present embodiment, when an image signal for focus detection suitable for use in focus adjustment is obtained in step S701, the processes in steps S703, S704, S709, S710, and S711 are repeated. When the image signal for focus detection is not saturated or when the effective open F-number does not change by more than a threshold value, the state of focus is determined to be either an in-focus state or an out-of-focus state and then focus adjustment ends. On the other hand, when the image signal for focus detection is saturated during focus adjustment control, the processes in steps S704 to S708 are executed after step S703. When the effective open F-number of the image-taking lens or the level of the image signal for focus detection largely changes, the processes in steps S703 to S708 are executed. When the brightness level of the focus area is not saturated in step S704 and the effective open F-number changes by less than a threshold value in step S709, the process exits from the loop processing of steps S703 to S708 and shifts to step S710.

In the present embodiment, when the brightness level of the focus area is saturated or the effective open F-number changes by more than a threshold value upon performing a focus adjustment operation by driving the focus lens 103, an exposure state can be readjusted to an appropriate level. Consequently, a focus detection signal suitable for use in focus adjustment is obtained, so that the amount of defocus to an in-focus position can be readily detected. Then, the processes in steps S703, S704, S709, S710, and S711 are repeatedly executed.

According to the present embodiment, an exposure state is readjusted to an appropriate level in the focus area based on the result of saturation determination processing performed during focus adjustment by driving the focus lens and the change of the effective open F-number of the image-taking lens. Consequently, an image signal suitable for use in focus adjustment control can be obtained, resulting in stabilization of focus adjustment. For example, in the case of a high brightness object, the level of the brightness signal obtained from the imaging element may be saturated as the focus lens approaches to the focused state. In this case, an exposure state can be readjusted to an appropriate level. When the focus is intended to be adjusted on the object corresponding to a macro area from the outside of the macro area, an effective open F-number may rapidly change, resulting in a reduction in the level of the brightness signal obtained from the imaging element. In this case, an exposure state can be readjusted to an appropriate level. Thus, an image signal suitable for use in focus adjustment control can be obtained in the focus area, resulting in suppression of occurrence of erroneous detection of the focus state.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-099184, filed on May 9, 2013, which is hereby incorporated by reference herein in its entirety.

What is claimed is:

1. A control device comprising:
a detecting unit configured to acquire an output signal from an imaging unit having an imaging element so as to perform phase difference type focus detection, wherein the imaging element outputs a signal photoelectrically converted at a predetermined cycle;
a determination unit configured to determine whether or not an output signal for phase difference type focus detection from the imaging unit is saturated; and
a control unit configured to perform exposure control of the imaging element and to perform focus adjustment control of an imaging optical system with respect to an object by acquiring detection information from the detecting unit,
wherein the control unit performs the focus adjustment control so as to move a focus lens comprised in the imaging optical system from a first position to a second position different from the first position, and performs exposure control when the determination unit determines that the output signal for the phase difference type focus detection from the imaging unit is saturated, and
wherein the determination unit determines whether or not the output signal for the phase difference type focus detection from the imaging unit which is acquired when the focus lens is positioned at the first position is saturated and determines whether or not the output signal for the phase difference type focus detection from the imaging unit which is acquired when the focus lens is positioned at the second position is saturated.

2. The control device according to claim 1, wherein the detecting unit acquires the focus detection signal output from a pixel portion, which corresponds to a target area on an imaging screen, of the imaging element so as to perform phase difference detection, and the control unit determines whether or not an output signal from the imaging unit related to the target area is saturated.

3. The control device according to claim 2, wherein the control unit performs exposure control when a correction value for not saturating the output signal falls within a control range whereas performs focus determination for an object corresponding to the target area when a correction value for not saturating the output signal falls outside the control range.

4. The control device according to claim 1, wherein the pixel portion of the imaging unit has a microlens and a plurality of photoelectric conversion units and outputs a focus detection signal.

5. The control device according to claim 1, wherein the control unit performs exposure control in accordance with a user's release operation and then performs focus adjustment.

6. The control device according to claim 5, wherein, when the control unit determines that the output signal from the imaging unit is saturated after first focus adjustment performed after the user's release operation, the control unit performs exposure control so as not to saturate the output signal from the imaging unit.

7. The control device according to claim 1, wherein the exposure control is at least one of charge accumulation time control of the imaging element, gain control of the output signal, and aperture control of the imaging optical system.

8. The control device according to claim 1, wherein, when the change of an effective open F-number of the imaging optical system upon the focus adjustment control is equal to or greater than a threshold value, the control unit calculates a correction value in the exposure state.

9. The control device according to claim 1, wherein the saturation determination by the determination unit is performed for an output signal for the phase difference type focus detection from the imaging unit prior to a computation of a phase difference.

10. The control device according to claim 1, wherein the determination unit acquires detection information obtained by the focus detecting unit and determines that the output signal from the imaging unit is saturated when the saturation level of the focus detection signal is greater than a determination threshold value.

11. The control device according to claim 8, wherein, when the saturation level of the focus detection signal is equal to or less than a determination threshold value and the change of the effective open F-number of the imaging optical system is less than a threshold value, the determination unit performs focus determination for an object corresponding to the target area.

12. The control device according to claim 1, wherein the determination unit performs first determination processing for determining the saturation level of the focus detection signal on the pixel-by-pixel basis and second determination processing for determining the saturation level of the focus detection signal on the row-by-row basis of the target area.

13. The control device according to claim 12, wherein the determination unit calculates a saturation determination value by comparing the saturation level with a first threshold value in the second determination processing and determines that the brightness level of an object corresponding to the target area is saturated when the sum of the saturation determination values is greater than a second threshold value.

14. The control device according to claim 1, wherein the control unit uses a predetermined correction value for the focus adjustment control.

15. The control device according to claim 1, wherein, when the determination unit determines that the output signal for the phase difference type focus detection from the imaging unit is saturated, the control unit performs exposure control so as not to saturate the output signal from the imaging unit.

16. A control device comprising:
a detecting unit configured to acquire an output signal from an imaging unit having an imaging element so as to perform phase difference type focus detection, wherein the imaging element outputs a signal photoelectrically converted at a predetermined cycle; and
a control unit configured to perform charge accumulation time control of the imaging element, gain control of the output signal, and aperture control of an imaging optical system and to perform focus adjustment control of the imaging optical system with respect to an object by acquiring detection information from the detecting unit,
wherein the control unit performs charge accumulation time control of the imaging element and gain control of the output signal in priority over aperture control of the imaging optical system depending on the level of the output signal from the imaging unit while repeating the focus adjustment control.

17. The control device according to claim 16, wherein the detecting unit acquires the focus detection signal output from a pixel portion, which corresponds to a target area on an imaging screen, of the imaging element so as to perform phase difference detection, and the control unit controls exposure depending on the level of the output signal from the imaging unit related to the target area.

18. The control device according to claim 16, wherein the pixel portion of the imaging unit has a microlens and a plurality of photoelectric conversion units and outputs a focus detection signal.

19. The control device according to claim 16, wherein the control unit performs exposure control in accordance with a user's release operation and then performs focus adjustment.

20. The control device according to claim 19, wherein the control unit performs the charge accumulation time control of the imaging element and the gain control of the output signal in priority over the aperture control of the imaging optical system depending on the level of the output signal from the imaging unit after first focus adjustment performed after the user's release operation.

21. A control method to be executed by a control device that comprises:
- a detecting unit configured to acquire an output signal from an imaging unit having an imaging element so as to perform phase difference type focus detection, wherein the imaging element outputs a signal photoelectrically converted at a predetermined cycle;
- a determination unit configured to determine whether or not an output signal for phase difference type focus detection from the imaging unit is saturated; and
- a control unit configured to perform exposure control of the imaging element and to perform focus adjustment control of an imaging optical system with respect to an object by acquiring detection information from the detecting unit, wherein the method comprising:
performing, by the control unit, the focus adjustment control so as to move a focus lens comprised in the imaging optical system from a first position to a second position different from the first position, and performing exposure control when the determination unit determines that the output signal for the phase difference type focus detection from the imaging unit is saturated, and determining, by the determination unit, whether or not the output signal for the phase difference type focus detection from the imaging unit which is acquired when the focus lens is positioned at the first position is saturated, and determining whether or not the output signal for the phase difference type focus detection from the imaging unit which is acquired when the focus lens is positioned at the second position is saturated.

22. A control method to be executed by a control device that comprises:
- a detecting unit configured to acquire an output signal from an imaging unit having an imaging element so as to perform phase difference type focus detection, wherein the imaging element outputs a signal photoelectrically converted at a predetermined cycle; and
- a control unit configured to perform charge accumulation time control of the imaging element, gain control of the output signal, and aperture control of an imaging optical system and to perform focus adjustment control of the imaging optical system with respect to an object by acquiring detection information from the detecting unit, wherein the method comprising:
performing, by the control unit, the charge accumulation time control of the imaging element and the gain control of the output signal in priority over the aperture control of the imaging optical system depending on the level of the output signal from the imaging unit while repeating the focus adjustment control.

* * * * *